United States Patent [19]

Pham et al.

[11] Patent Number: 4,746,941

[45] Date of Patent: May 24, 1988

[54] DOT PRINTER WITH TOKEN BIT SELECTION OF DATA LATCHING

[75] Inventors: Hieu T. Pham, Webster; Yee S. Ng, Fairport; Eric K. Zeise, Pittsford; Kenneth D. Kieffer; Pin S. Tschang, both of Rochester, all of N.Y.

[73] Assignee: Eastman Kodak Company, Rochester, N.Y.

[21] Appl. No.: 107,315

[22] Filed: Oct. 13, 1987

[51] Int. Cl.⁴ .............................................. H04N 1/00
[52] U.S. Cl. ..................................... 364/519; 346/154
[58] Field of Search ....................... 364/518, 519, 523; 346/154; 350/332; 406/16, 17, 61, 62, 76; 358/280

[56] References Cited

U.S. PATENT DOCUMENTS 4,525,729  6/1985  Agulnek et al. .................... 364/519
4,541,061  9/1985  Schoon ................................ 364/519
4,571,602  2/1986  De Schamphelaere et al. ... 364/519
4,596,995  6/1986  Yamakawa et al. ................ 364/519
4,609,920  9/1986  Segarra .............................. 364/519

FOREIGN PATENT DOCUMENTS 61-161074A  9/1985  Japan ................................. 364/519

Primary Examiner—Arthur G. Evans
Attorney, Agent, or Firm—Norman Rushefsky

[57]  ABSTRACT

In a non-impact dot printer, such as an LED printer, multiple bits of image data determining the on-time of each LED are latched into an appropriate data register in accordance with a token bit that is passed along a shift register. The shift register is preferably bi-directional to permit for selection of direction wherein identical driver circuitry is provided on opposite sides of a line of LED's.

8 Claims, 4 Drawing Sheets

DOT PRINTER WITH TOKEN BIT SELECTION OF DATA LATCHING

BACKGROUND OF THE INVENTION

1. Field of the Invention

The present invention relates to a dot printer for printing characters, halftone images and the like with small pixels (dots).

2. Description of the Prior Art

Various recording element sections or printer heads for use in dot printers that form output images with dots are known. Examples of such heads include a wire dot printer head, an electrostatic printer head, an ink-jet printer head, a thermal printer head, an LED (light emitting diode) array printer head and the like. An LED array printer head having 8 or more elements per mm as the dot generating elements is receiving considerable attention due to its extremely high resolution. When this head is used in place of an optical scanning mechanism in a conventional electrophotographic copying machine, a printer can be realized in which an array of LED's is selectively turned on in accordance with a video signal to form an electrostatic latent image on a surface of an adjacent photosensitive body and a visualized image is obtained through a transfer process of the developed image onto a transfer sheet. In a printer of this type, a portion corresponding to the "ON" LED's can be formed into a black or white image portion by changing the charging conditions or toner.

In U.S. Pat. No. 4,596,995, examples of printers of the kind referred to above are described. In printers described in this apparatus, registers are provided for latching image data signals to respective LED's or recording elements to be enabled. In order to determine which register is to latch an image data signal rather complex circuitry in the form of a counter and decoder is provided to generate a signal to allow a register to latch the data from a data bus.

It is an object of the invention to provide printer apparatus with a more simplified means for data latching and that is particularly advantageous when multiple bits of data are used to record each pixel or dot.

It is a further object of the invention to provide printer apparatus with a data latching means that allows for similar circuitry for data latching to be operated in selected directions, the advantages of which will be more fully appreciated after reading of the specification herein.

SUMMARY OF THE INVENTION

The objects of the present invention are realized by a dot printer apparatus comprising:

a recording head having a plurality of recording elements for dot-recording on a recording medium;

driving means for selectively driving said plurality of recording elements in accordance with respective image data signals;

said driving means including respective data register means associated with each recording element for storing said image data signals;

data bus means for carrying image data signals;

means commonly connecting said data bus means to said data register means;

a multistage bi-directional shift register means for outputting sequentially at respective stages a token bit signal for sequentially selecting a respective data register means for accepting image data signals; and means connected to said bi-directional shift register means for establishing the direction of shifting of said token bit signal along said shift register means.

The objects of the present invention are further realized by a dot printer apparatus comprising:

a recording head having a plurality of recording elements for dot recording on a recording medium; driving means for selectively driving said plurality of recording elements in accordance with respective image data signals; a multistage shift register means for sequentially outputting at a respective stage a token bit signal; data bus means including a plurality of independent data lines for carrying image data signals; data register means including separate register means for each of said recording elements; said separate register means of each said recording elements being commonly connected to said data bus means; said separate register means including a plurality of bi-stable multivibrator elements; means commonly connecting each of said respective stages of said multistage shift register to a said plurality of bi-stable multivibrator elements associated with a respective separate register means to enable said bi-stable multivibrator elements to respond to image data signals on said data bus in coordination with a token bit signal output from said respective stage.

The above and other objects and features of the present invention will become apparent from the following description taken in conjunction with the accompanying drawings.

BRIEF DESCRIPTION OF THE DRAWINGS

The subsequent description of a preferred embodiment of the present invention refers to the attached drawings wherein.

DESCRIPTION OF THE PREFERRED EMBODIMENT

Because apparatus of the type described herein are well known, the present description will be directed in particular to elements forming part of, or cooperating more directly with, the present invention.

Figure 1:
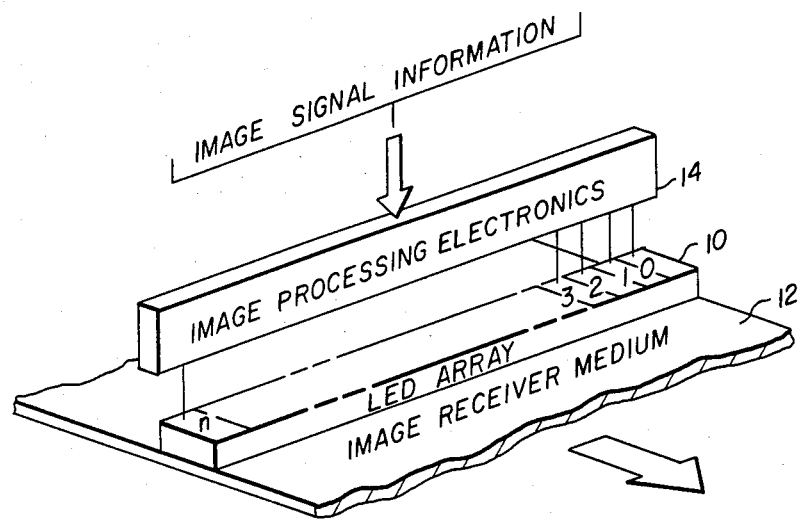
FIG. 1 is a perspective view illustrating the general arrangement of a prior art non-impact printer.

The apparatus for the herein disclosed invention is typified by the diagram of FIG. 1: a linear array 10 of 3583 triggerable recording elements; e.g. LED's, is disposed to expose selectively a photosensitive image-receiver medium 12 that is movable relative to the array by suitable conventional means (not shown). Optical means for focusing the LED's onto the medium may also be provided. In this regard, gradient index optical fiber devices such as Selfoc (trademark of Nippon Sheet Glass Co., Ltd.) arrays are highly suited. The LED's of the array are triggered into operation by means of image processing electronics 14 that are responsive to image signal information. Depending on the duration for which any given LED is turned on, the exposure effected by such LED is more or less made. Where the medium 12 is, say, photographic film the latent image formed line by line by selective exposure of said LED's may be subsequently developed by conventional means to form a visible image. Where the medium 12 is an electrophotographic receptor, the LED's may be used to form an electrostatic image on a uniformly electrostatically charged photoconductor and this image developed using opaque toner particles and perhaps transferred to a copy sheet, see U.S. Pat. No. 3,850,517, the contents of which are incorporated herein by this reference.

Figure 2:
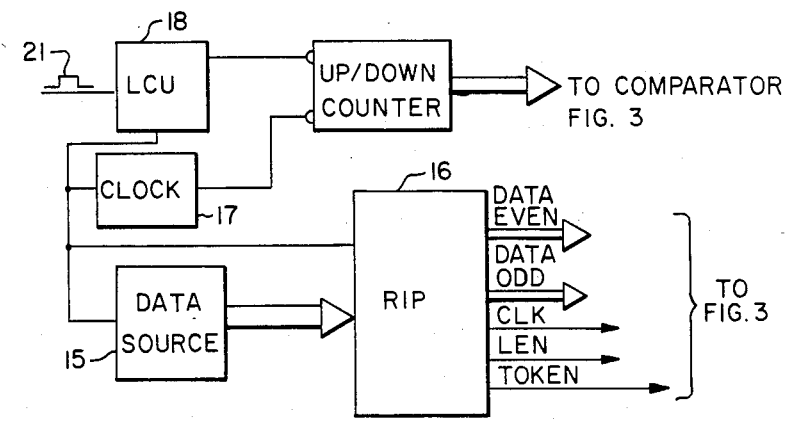
FIG. 2 is a block diagram of a circuit for providing signals to a non-impact head made in accordance with the invention and FIGS. 3a, b and c represent a schematic of a circuit for a non-impact print head made in accordance with the invention.
Figure 3A:
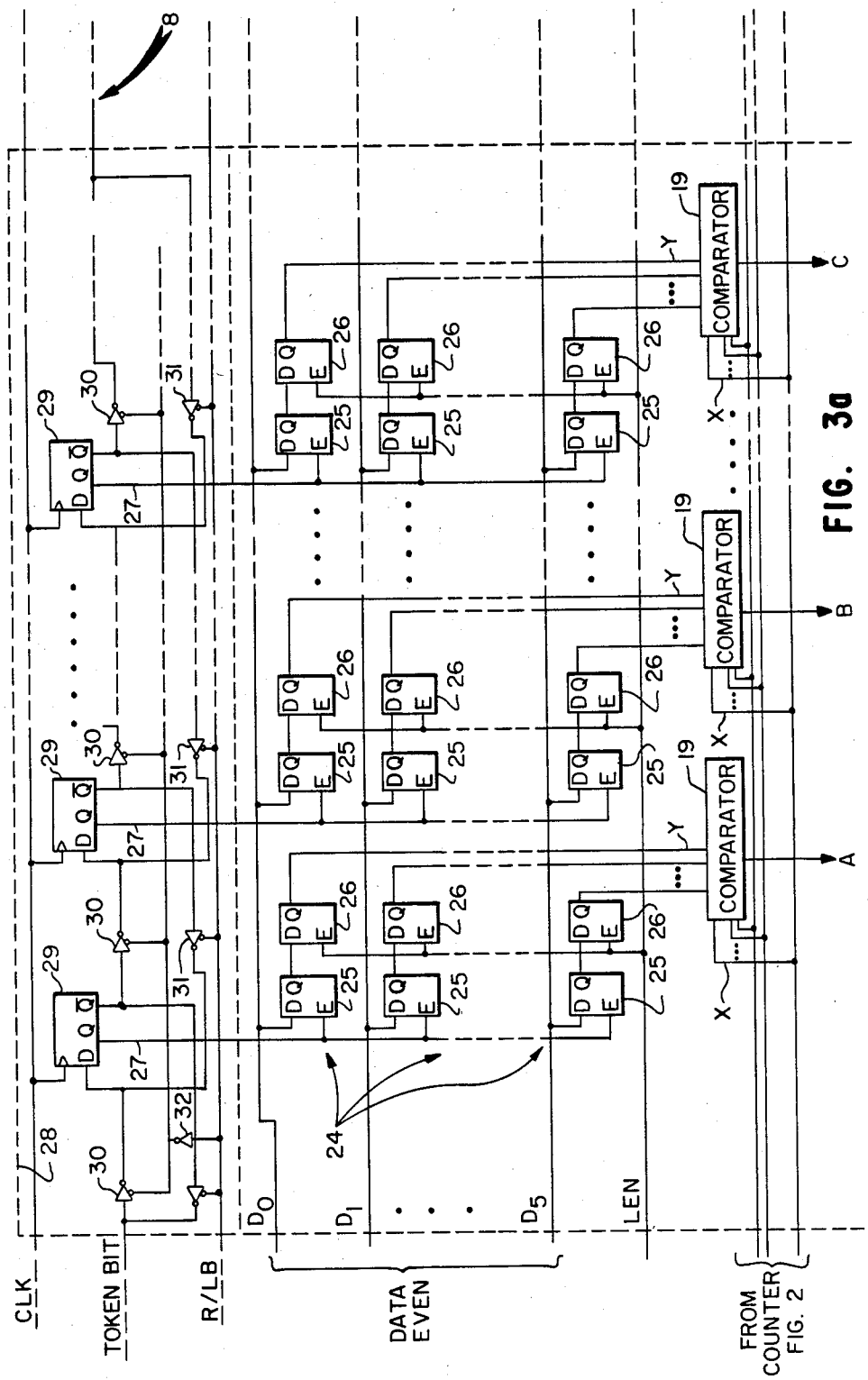
Figure 3B:
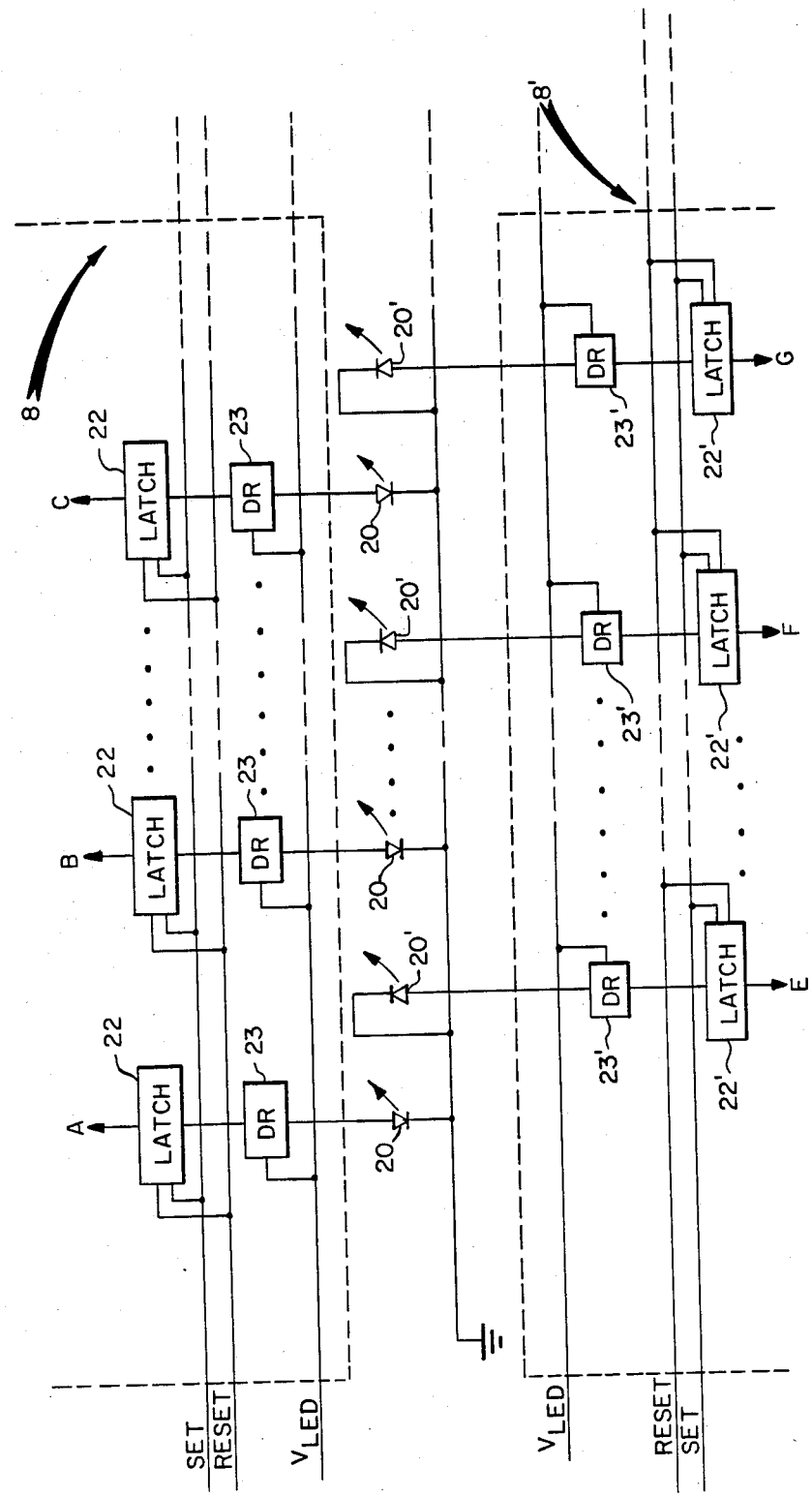
Figure 3C:
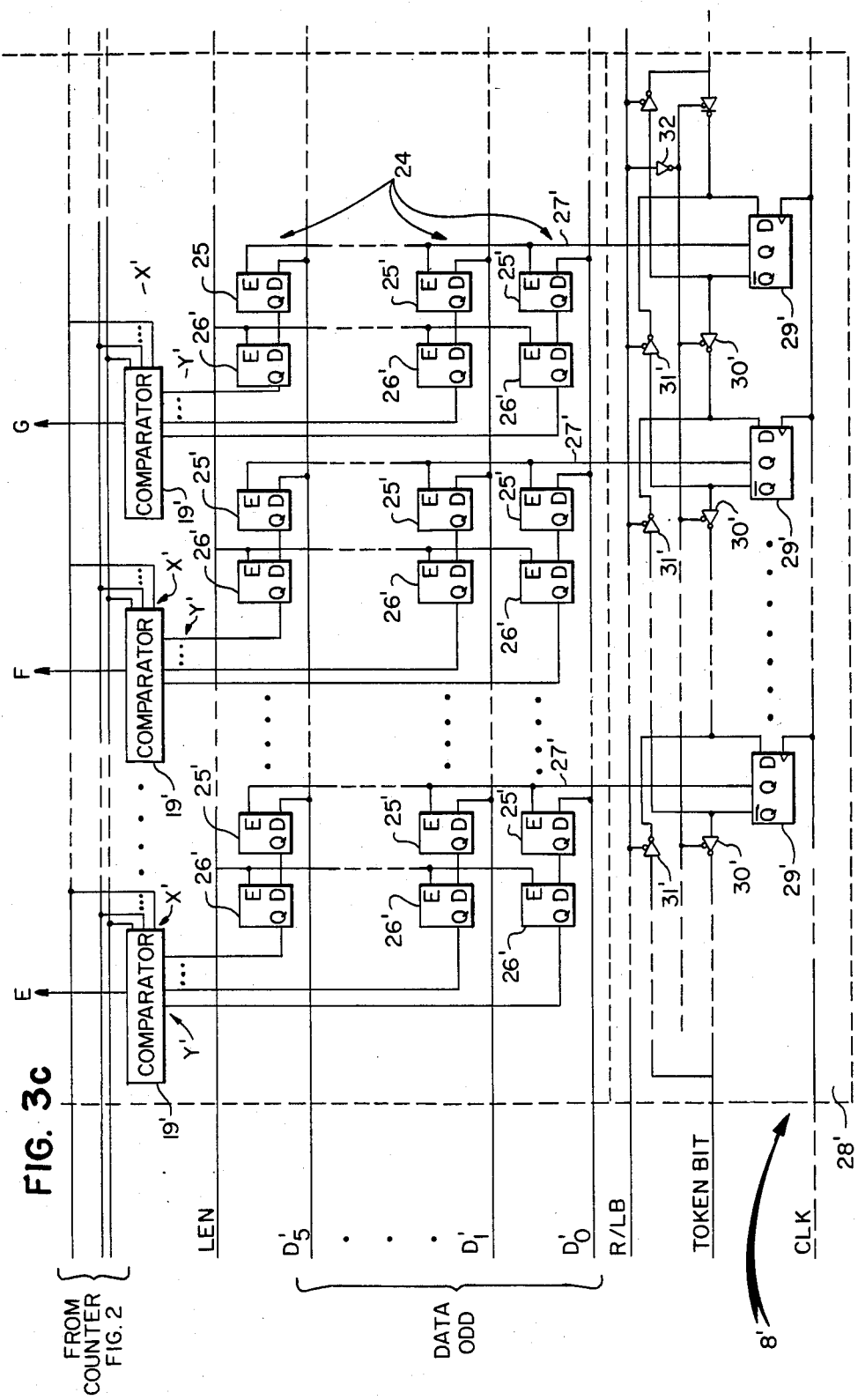

With reference now to FIGS. 2 and 3, a data source 15 such as a computer, word processor, image scanner or other source of digitized image data, provides image data signals to a data processor 16 which may comprise a raster image processor. The data processor under control of clock pulses from a logic and control device (LCU) provides a plurality of outputs including rasterized data outputs and control signals which are fed to the print head. In addition, a clock 17 in response to signals from the LCU provides clock pulses to an up/down counter 18 which, when enabled by a signal from the LCU, counts such clock pulses and provides at an output having a plurality of lines a digital signal representation of the state of the counter. Typically, such a counter has one line representing a least significant bit of such count and other lines representing other more significant bits. In accordance with a technique fully described in U.S. application Ser. No. 000,295, filed Jan. 2, 1987 in the names of Ayers et al, the contents of which are incorporated herein by this reference, the output of counter 18 is provided to a first set of input terminals to a comparator 19 associated with each recording element 20, 20', i.e., LED in this embodiment. A plurality of data lines are also provided to a second set of input terminals associated with each comparator. The comparators 19 all compare the output of the counter 18 with the value of the data. As will be described herein, the image data signals provided to each comparator relates to a desired ON time or period of enablement for a respective LED 20, 20' for the recording of a particular pixel. As is well known, the LED's are alternately divided into odd and even-numbered LED's so that respective integrated circuit driver chips 8, 8' therefore are located on opposite sides of the line of LED's. As the circuitry is similar for the corresponding driver chips, a prime (') will be used to denote the circuitry associated with the odd-numbered LED's. The image data signals provided to each comparator 19 during the printing of a single line of dots by the row of LED's is related to the desired pixel or dot size to be exposed onto the image receiver medium by that LED for that particular line of dots. As shown in FIGS. 3a, 3b and 3c, six independent lines of data $D_1$ through $D_5$ provide a six bit digital image data signal that allows for grey-scale variation of the output of each LED during each cycle of operation. During each cycle the data to each comparator may comprise six binary bits representing an amount from decimal 0 to decimal 63. Although the data lines $D_0$ through $D_5$ and other signal lines are shown passing through the driver chips, it will be appreciated that this is for the convenience of this description and that conventionally such lines are formed outside of the chips and connections made to these lines using "pads" or suitable connection points associated with the chips.

Suppose, for example, that the LED is to be enabled for a time period equal to 19 clock periods plus $T_{MIN}$. $T_{MIN}$ represents a pre-established minimum LED on time. In response to a start of line pulse 21, the counter is enabled and commences to count from decimal 63 to 0. The six bit output of counter 18 is coupled to one set of inputs at terminal X of each of the comparators. This counter is now compared with the data input at another set of inputs at terminal Y of this comparator which represents in binary form decimal ten. When there is a "match," i.e., when the count of terminal X is 10, a pulse is provided at the output terminal to cause latch 22 to enable the driver 23 to commence and maintain current to LED 20. After the counter counts down to zero, the counter is inhibited from counting additional clock pulses for a period $T_{MIN}$ that is either programmed into the counter or provided by other suitable means. After this predetermined time period $T_{MIN}$ the counter is set to count in its up mode and commences counting clock pulses again. When the counter, in its count up mode, reaches decimal 10 the latch 22 is reset and current to the LED ceases. The other LED's, etc. operate in similar fashion but their data may require different count values to turn on and off. What these LED's will thus have in common is that all will have their respective current pulses centered, i.e., the midpoints of the respective current pulses will occur at the same time. The pulse duration for each LED during each line of print is varied, however, in accordance with their respective image data signals. In this embodiment, the LED's may be initially "balanced" such as by adjusting a "trim" resistor respectively associated with each LED. In lieu of balancing the LED's with trim resistors, correction for unequal light output may be provided by adjustment of the data in accordance with the characteristics of each LED. Thus, a programmable read only memory device or PROM may store the characteristics of each LED and data for that LED can be modified to provide an input count at terminal Y that represents data modified by the exposure characteristics of the LED. For example, for an LED that is a relatively strong light emitter the PROM would modify data bits for that LED to reduce the count that otherwise would be provided at terminal Y based solely on the data.

Still other circuitry for balancing the driving current to the LED's is described in U.S. patent application Ser. No. 033,550, filed on Apr. 1, 1987 in the name of Pham et al.

The description of the circuitry forming a part of the driving circuitry for distributing the image data signals to the appropriate comparator to which the present invention is particularly directed will now be described. It being understood, of course, that the invention in its broader aspects contemplates circuits that do not employ a comparator to control enablement of "ON" time. In the example of the circuitry for the print head shown in FIGS. 3a, b and c, the driving circuitry for the LED's are provided on opposite sides of the line of LED's 20. This is a known desirable arrangement for permitting LED's to be packed closer together to provide greater image resolution capabilities for the printer. As may be noted the circuit arrangement is an alternating one such that what may be called the even-numbered LED's have their respective driving circuitry located to one side of the line of LED's and what may be called the odd-numbered LED's have their respective driving circuitry located to the other side of the line of LED's. Typically, groups of, say, 64 of the odd numbered LED's will have their respective driving circuitry formed in a single integrated circuit chip and thus, for a print head having 3584 LED's on the print head, there may be 28 driving chips located on each side of the line of LED's. In order to save on production costs for these driving chips, it is desirable that they be identical. For the driving chips to be identical, although locatable on either side of the line of LED's, it is desirable for design simplicity that signals traversing the length of the print head be programmably movable in either direction. Such signals primarily involve the data image signals. The image data signals are output by the data processor 16 in accordance with image data signals for the odd-numbered LED's and image data signals for the even-numbered LED's. Discussion will now be made with regard to the image data signals for the even-numbered LED's, since operation and circuitry for the odd-numbered LED's is identical. Data lines $D_0$–$D_5$ are independent lines each carrying a signal representing a digital bit (0 or 1) so that together their respective signals define a digital six bit number from decimal 0 to decimal 63. This image data signal is passed along lines $D_0$–$D_5$ which comprises an image data signal bus. Associated with each LED is a data register means 24 for latching data from this bus during each cycle of operation for printing a single line of dots. As will be described a token bit is used to enable a data register means associated with a particular LED to accept the data while other data register means associated with other LED's await their respective data.

The data register means 24 for each LED comprises a pair of latches 25, 26 or bi-stable multivibrators for each of the six data lines. The pair of latches are connected in a master-slave relationship wherein in response to a token bit signal at the enable input terminal of the master latch 25, an image data signal at the data input terminal of the master latch 25 will cause the output of the master latch to either change or remain the same depending upon the image data signal. It will be noted that the six (only three of which are shown) master latches 25 in the data register means of each LED are commonly connected by line 27 (noninverted output line of flip-flop 29) to simultaneously receive the token bit signal from the token bit shift register 28.

The token bit shift register 28 comprises a series of flip-flops 29 which have clock pulses applied to the clock terminals thereof and the signal representing the token bit input to the data input terminal of each. Note that the same token bit signal will be provided to both the even and odd token bit shift registers 28, 28'. The $\overline{Q}$ or inverted outputs of each of these flip-flops 29 is connected to the data input terminal of the next flip-flop 29 in the series through a tri-state inverter 30. A duplicate connection is made in the opposite direction through tristate inverters 31 so that programmable control may be made of the direction for shifting the token bit along the token bit shift register 28. In the example where the token bit is to be shifted from left to right in FIG. 3a for the Data Even half of the print head, the line R/LB (right-left bit) is made logic high causing the output of its respective inverter 32 to go to logic low. This provides an enable signal to the tristate inverters 30 and they operate as normal inverters. The tristate inverters 31 are not enabled and provide a high impedance or near open circuit condition at their outputs. Thus, in response to clock pulses from the data processor 16 the token bit is passed from stage to stage of the token bit shift register 28 and accordingly outputted sequentially for enablement of the master latches 25 of a respective data register 24. With movement of the token bit from stage to stage of the shift register 28 the data bits occurring on lines $D_0$–$D_5$ are accepted by the data registers 24 in turn from left to right until all the 1792 data registers on this side of the print head have acquired their respective six bits of data. A latch enable signal is then applied on line LEN to cause the respective slave latches 26 to latch the data at their respective outputs. The respective outputs of the slave latches 26 are now communicated to the data input terminals Y of the respective comparators 19 for determining the duration of exposure for each LED in accordance with the techniques described above. The master latches 25 are now free to receive the image data signals for the next line of dots to be recorded.

For the operation of the Data Odd registers the R/LB line is made logic low so that the token bit passes from left to right in FIG. 3c. Thus, identical driving circuit chips are used for the odd and even numbered LED's by employing the programmable token bit to simplify and facilitate the circuits mounted on the print head. The advantages to using identical circuits on different sides of the print head is in addition to the obvious economic benefits of making them identical. With identical chips there is greater likelihood that their driving capabilities will be more identical to provide more uniform output by the LED's. In addition, the circuitry for formatting data to the printhead is simplified.

The use of the token bit to control bidirectional shifting of data on the printer apparatus represents a substantial saving of circuitry over those known in the prior art. For example, in the prior art each of the plural data bits will have to have separate shift registers and associated logic for shifting data in selectable directions along the registers. Thus, where six data bits, for example, are used to define each pixel or dot size, each of the six shift registers used in the prior art would be required to have directional logic devices associated with such registers not unlike that shown and described for the one register for shifting the token bit. The use of the token bit for bidirectional shifting, therefore, greatly reduces the required number of circuitry and pads for accomplishing the desired goal, thereby facilitating construction of the print head.

The master-slave latch arrangement as noted above permits data to be written into the master latch while the slave latch contains other data. Normally, for such purpose, each stage of a shift register would have three or more latches used to shift one bit of data. Thus, the use of the master-slave latch arrangement is also advantageous in reducing the number of required circuits thereby facilitating construction of the print head.

Thus, there is facilitated the incorporation of the token bit register 28 and data registers 24 in an integrated circuit chip 8 which also includes the comparators 19, latches 22 and current drivers 23 to comprise a driving circuit for a group of say 64 LED's. The counter 18 also may be made part of each chip 8. As is well known, driving circuitry for each of an odd and even group of LED's may be mounted on modules that can be independently tested before being assembled on a print head. With assembly of the modules on the print head, electrical interconnections are made to allow passage of the token bit and other signals between adjacent chips.

The invention has been described in detail with particular reference to preferred embodiments thereof, but it will be understood that variations and modifications can be effected within the spirit and scope of the invention.

We claim:

1. A dot printer apparatus comprising:
   a recording head having a plurality of recording elements for dot-recording on a recording medium;
   driving means for selectively driving said plurality of recording elements in accordance with respective image data signals;
   said driving means including respective data register means associated with each recording element for storing said image data signals;
   data bus means for carrying image data signals;
   means commonly connecting said data bus means to said data register means;
   a multistage bi-directional shift register means for outputting sequentially at respective stages a token bit signal for sequentially selecting a respective data register means for accepting image data signals; and
   means connected to said bi-directional shift register means for establishing the direction of shifting of said token bit signal along said shift register means.

2. The apparatus of claim 1 and wherein said data bus means comprises a plurality of independent data lines, each carrying image data signals and said data register means for each of said recording elements is coupled to said bus means to receive data signals from each of said data lines.

3. The apparatus of claims 1 or 2 and wherein said respective data register means comprises a master latch and a slave latch responsive to the output of said master latch and said master latch is coupled to said data bus means and changes output in accordance with image data signals on said data bus means and in response to said token bit.

4. The apparatus of claim 3 and wherein said respective data register means comprises a plurality of master latch and slave latch combinations, each combination being connected to a separate data line of said data bus means, the master latches of each respective data register means being commonly connected simultaneously to a same register stage of said bi-directional shift register means.

5. The apparatus of claim 4 and wherein said driving means includes means responsive to the output signals of said slave latches in said respective data register means for driving a respective recording element for a time period related to said output signals of said slave latches.

6. A dot printer apparatus comprising:
   recording head having a plurality of recording elements for dot recording on a recording medium;
   driving means for selectively driving said plurality of recording elements in accordance with respective image data signals;
   a multistage shift register means for sequentially outputting at a respective stage a token bit signal;
   data bus means including a plurality of independent data lines for carrying image data signals;
   data register means including separate register means for each of said recording elements, said separate register means of each said recording elements being commonly connected to said data bus means;
   said separate register means including a plurality of bi-stable multivibrator elements; and
   means commonly connecting each of said respective stages of said multistage shift register to a said plurality of bi-stable multivibrator elements associated with a respective separate register means to enable said bi-stable multivibrator elements to respond to image data signals on said date bus in coordination with a token bit signal output from said respective stage.

7. The apparatus of claim 6 and wherein each of said plurality of bi-stable multivibrator elements has its respective output coupled to a second bi-stable multivibrator element for latching an image data signal at the output of said second bi-stable multivibrator element.

8. The apparatus of claims 6 or 7 and including means for controlling the direction of shifting of the sequence of output of said token bit.

* * * * *